M. SEDIG.
HARVESTING MACHINE HITCH.
APPLICATION FILED NOV. 4, 1916.

1,319,626.

Patented Oct. 21, 1919.
3 SHEETS—SHEET 2.

Witnesses
J.H.Crawford
J.W.Cramer

Inventor
Martin Sedig,

By Victor J. Evans
Attorney.

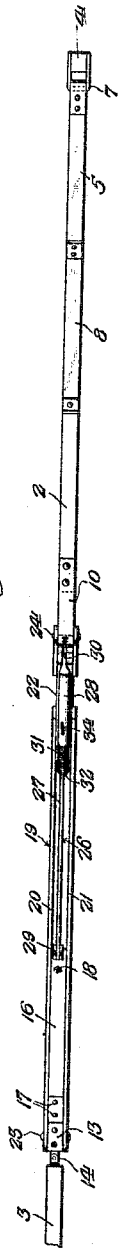

UNITED STATES PATENT OFFICE.

MARTIN SEDIG, OF SIOUX CITY, IOWA.

HARVESTING-MACHINE HITCH.

1,319,626.    Specification of Letters Patent.    Patented Oct. 21, 1919.

Application filed November 4, 1918. Serial No. 261,074.

*To all whom it may concern:*

Be it known that I, MARTIN SEDIG, a citizen of the United States, residing at Sioux City, in the county of Woodbury and State of Iowa, have invented new and useful Improvements in Harvesting-Machine Hitches, of which the following is a specification.

This invention is an improved hitch for trailing one self binding harvesting machine behind another and arranging and holding the harvesters in the required relation oblique to the line of draft, to cause each machine to cut its own swath and prevent overlapping and also prevent any of the grain from being left uncut between the swaths, the object of the invention being to provide an improved hitch of this kind which is simple in construction, is automatic in operation, which causes the trailing harvester to be turned in unison with the front harvester at a corner and which also obviates the employment of cables.

With the above and other objects in view, the invention consists in the construction, combination and arrangement of devices hereinafter described and claimed.

In the accompanying drawings:

Fig. 3 is a side elevation of the same.

Figure 2:
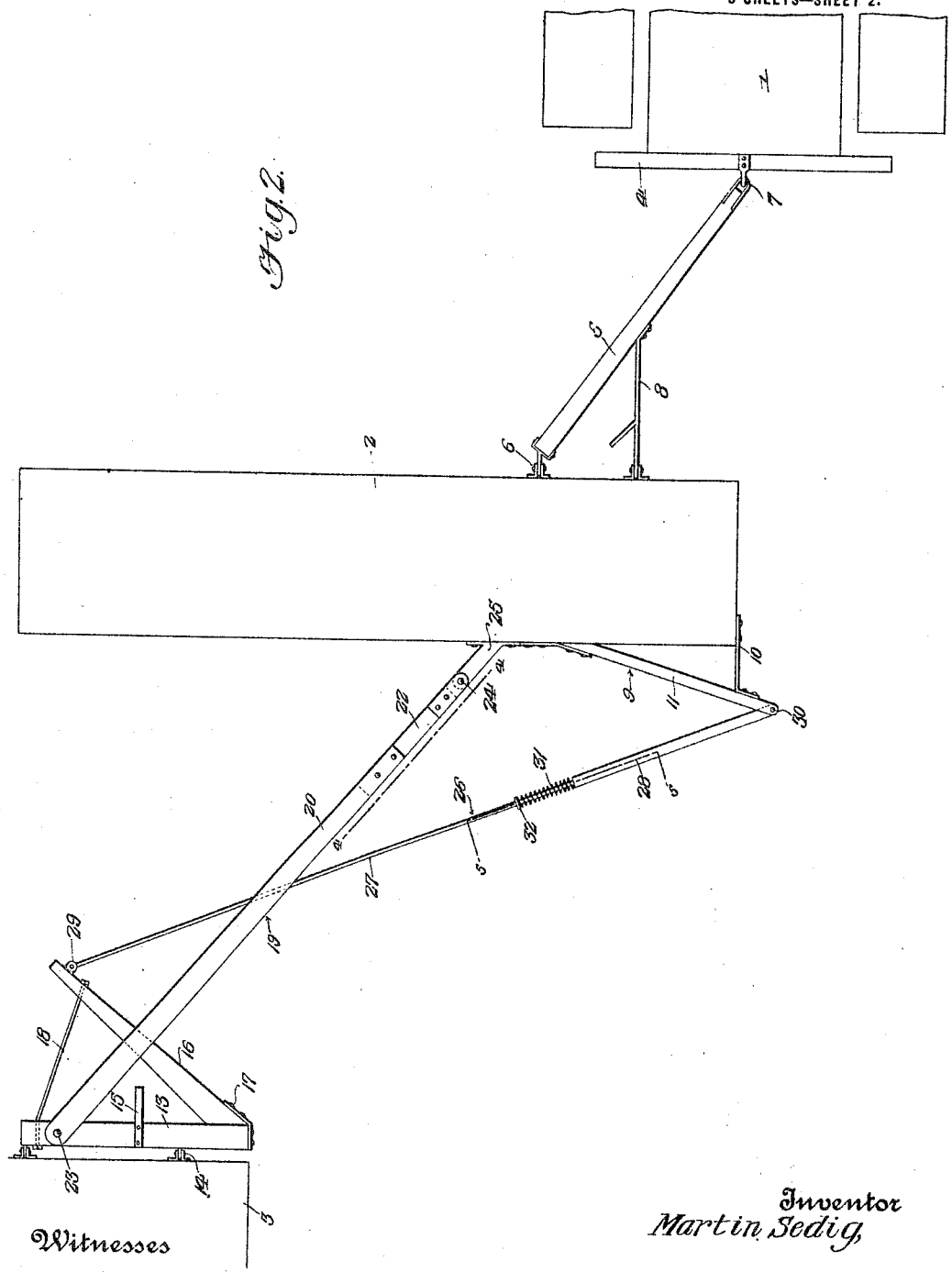
Fig. 2 is a plan, on a larger scale, of my improved hitch.

Figs. 4 and 5 are detail sectional views of the same taken respectively on the planes indicated by the lines 4—4 and 5—5 of Fig. 2.

Figure 1:
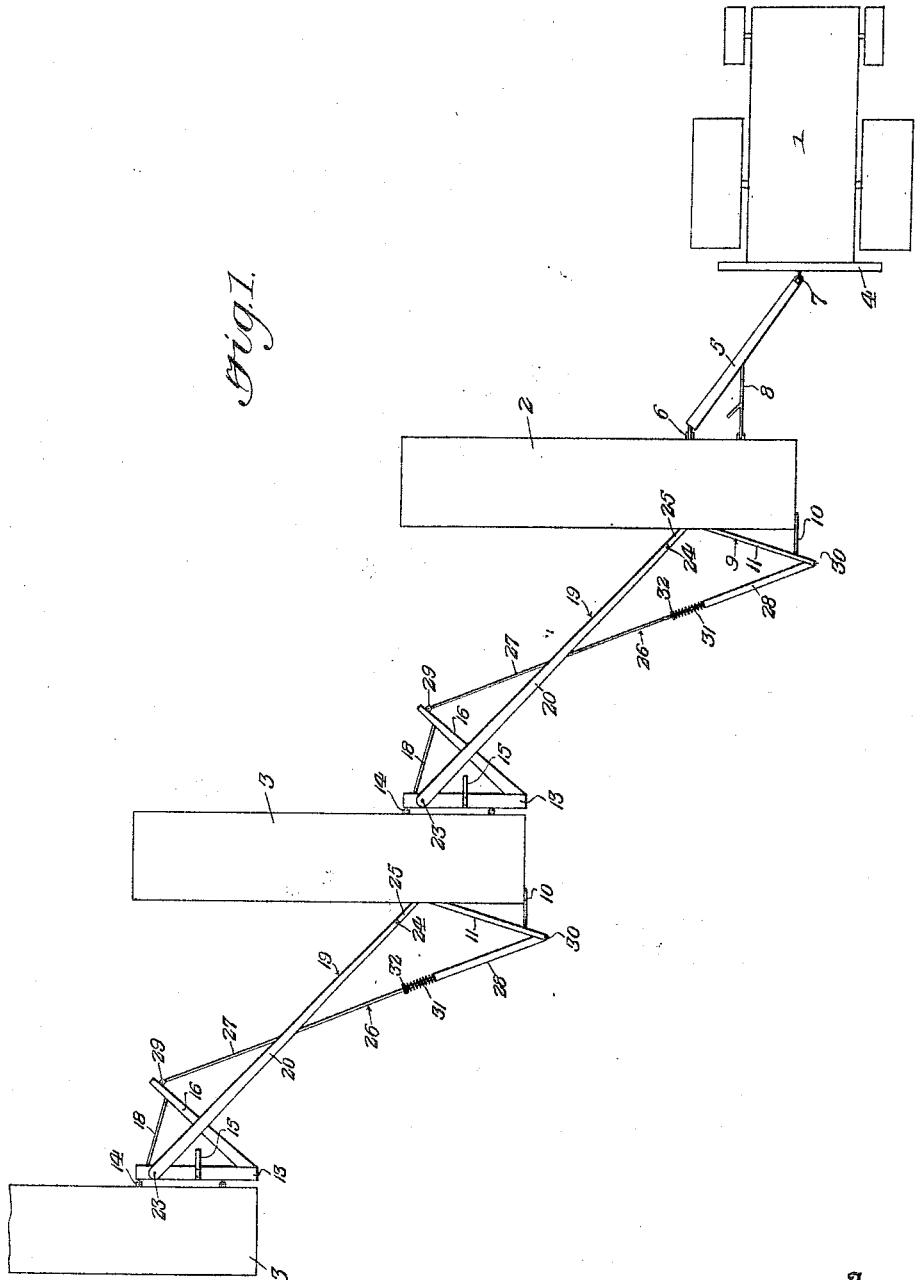
Figure 1 is a diagrammatic plan showing a traction engine, a front harvesting machine drawn directly by the engine and trailing harvesting machines connected by means of my improved hitches and arranged obliquely and for cutting their respective swaths.

A traction engine is indicated diagrammatically in Fig. 1 at 1, a front harvesting machine, drawn directly by the engine, is indicated at 2, and trailing harvesting machines are indicated at 3. The draw bar of the engine is indicated at 4. A draft tongue 5 has its rear end pivotally connected, as at 6, to the front side of the front harvester 2 at a suitable distance from the stubble end of said harvester. The front end of the draft tongue is connected, as at 7, to the draw bar of the engine and a suitable brace 8 is provided to hold the tongue at the required angle to the line of draft.

The front harvester is provided at the stubble end and on the rear side with an attaching element 9 which comprises a rearwardly extending bar 10 bolted to the inner or stubble end of the harvester frame and an obliquely extending bar 11 the inner end of which is bolted to the rear side of the harvester frame, the intermediate portion of said bar 11 being bolted to the rear end of the bar 10 and the outer end of said bar 11 projecting from beyond the stubble side of the bar 10.

Each trailing harvester 3 is provided on the front side, at the stubble end, with a tree 13 which is hingedly connected thereto, as at 14, for vertical angular movement and is also provided with a tilting post 15. A tracking arm 16 is arranged obliquely and in front of the tree 13 and has its outer end secured to the outer end of the tree as by means of bolts 17. A brace rod 18 also connects the inner end portions of the tree and the tracking arm.

A trailing bar 19 is here shown as comprising a pair of spaced upper and lower rear members 20, 21 and a front member 22, the rear portion of which is bolted between the front ends of the members 20, 21. Said members 20, 21 are arranged one above and the other below the tree and their rear ends are pivotally connected thereto by a vertical pivot bolt 23. The trailing bar is arranged substantially at right angles to the tracking arm, the tracking arm passing through the space between the members 20, 21 so that said trailing bar is angularly movable with respect to the tracking arm. The front end of the trailing bar is pivotally connected, as at 24, to the rear end of a draft bar 25 which is secured to the frame and at a suitable distance from the stubble end of the front harvester.

A thrust rod 26 is here shown as comprising a pair of telescopically related tubes 27, 28, the rear tube 27 being pivotally connected as at 29 to the rear end of the tracking arm 16 and the front end of the tube 28 being pivotally connected as at 30 to the outer end of the bar 11 of the attaching element 9 of the front harvester. A coiled shock absorbing spring 31 is arranged around the tube 27 and bears at its front end against the inner end of the tube 28 and at its rear end against a stop 32 with which the tube 27 is provided. The thrust rod also passes between the members 20, 21 of the trailing bar and the member 27 is connected to the member 28 for limited longitudinal movement by bolts 33 which operate in slots 34.

Several harvesting machines can be thus connected together and arranged in the required oblique relation with respect to the line of draft, one of my improved hitches being required for each trailing harvester. The trailing bar causes the trailing harvester to be drawn by the front harvester and the tracking arm, thrust rod, and attaching element hold the trailing harvester parallel with the front harvester when the harvesters are proceeding in a right line and also cause the trailing harvester to turn behind the front harvester at a corner, so that the harvesters can be continually at work when turning a corner, prevented from overlapping in their cut and also prevented automatically from leaving uncut grain between their swaths. The cushioning spring which forms an element or thrust rod absorbs the jars incident to the passing of the grain wheel on the rear or trailing harvester over rough ground.

While I have herein shown and described a preferred embodiment of my invention, I would have it understood that changes may be made in the form, proportion and construction of the several parts without departing from the spirit of my invention and within the scope of the appended claims.

Having thus described my invention, I claim:

1. In a hitch of the class described, in combination with an attaching element to be secured to the rear side of the stubble end of a harvester, a tree for attachment to the front side of the stubble end of a trailing harvester, a tracking arm arranged obliquely in front of the tree and attached at its outer end to the outer end of the tree, a trailing bar pivotally connected to the inner end portion of the tree and extending across and substantially at right angles to the tracking arm, means to attach the front end of the trailing bar to the front harvester, and a thrust rod pivotally connected to the attaching element and also pivotally connected to the inner end of the tracking arm, said thrust rod intersecting and being arranged at an angle to the trailing bar.

2. In a hitch of the class described, comprising a trailing bar arranged between the front and rear harvesters, an attaching element carried by the corresponding ends of the harvesters, the opposite ends of said bar being pivotally connected with said elements, a stop projecting from the attaching element carried by the rear harvester, a tracking arm obliquely disposed with respect to and connected with said last mentioned element, said trailing bar being longitudinally slotted, a thrust rod having one end pivotally secured to the free end of said tracking arm, and its opposite end similarly connected to the said attaching element carried by the front harvester, said rod being passed through said slot of the trailing bar, and comprising slidably related members, and a cushioning means between said members.

In testimony whereof I affix my signature.

MARTIN SEDIG.

Copies of this patent may be obtained for five cents each, by addressing the "Commissioner of Patents, Washington, D. C."